United States Patent [19]

Hoffmann

[11] 4,405,175
[45] Sep. 20, 1983

[54] RESILIENT SEALING FRAME FOR THE FRONT AND REAR WINDOWS OF A VEHICLE

[75] Inventor: Elmar Hoffmann, Munich, Fed. Rep. of Germany

[73] Assignee: M.A.N. Maschinenfabrik Augsburg-Nurnberg GmbH, Munich, Fed. Rep. of Germany

[21] Appl. No.: 313,134

[22] Filed: Oct. 20, 1981

[30] Foreign Application Priority Data

Oct. 24, 1980 [DE] Fed. Rep. of Germany ....... 3040126

[51] Int. Cl.³ ............................................. B62D 27/02
[52] U.S. Cl. ..................................... 296/201; 296/93; 52/208; 49/488
[58] Field of Search ............... 296/93, 84 D, 84 R, 296/201; 52/208, 397, 398, 743; 49/488

[56] References Cited

U.S. PATENT DOCUMENTS 3,037,810  6/1962  Kelley ................................. 52/400
3,968,612  7/1976  Endo et al. ......................... 52/208
4,001,974  1/1977  Wright ................................. 49/488

Primary Examiner—Robert R. Song
Assistant Examiner—Dennis H. Pedder
Attorney, Agent, or Firm—Alan H. Levine

[57] ABSTRACT

A resilient sealing frame having two continuous slots, one for accommodating the periphery of a vehicle window and the other for accommodating a web projecting from the vehicle body into the vehicle opening which accommodates the window. One wall of each slot has a continuous groove, and a pair of closely spaced-apart holes extend from each groove to the exterior surface of the sealing frame. Each groove is flanked by prominent sealing lips which seal against a surface of its respective window or web. The short length of each groove between the pair of holes is plugged, such as with a resilient cord. Fluid cement is injected into one of the holes of each pair; the cement flows through the long length of each groove and when it reaches the other hole of the pair, further injection of cement is terminated, since the groove has been completely filled.

5 Claims, 5 Drawing Figures

RESILIENT SEALING FRAME FOR THE FRONT AND REAR WINDOWS OF A VEHICLE

Resilient sealing frames used to date for the front and rear window panes of motor vehicles are made of a resilient material and designed to serve a sealing function in the absence of any other sealing provision. But, since the cross-sectional shape is not in all cases able to compensate for manufacturing tolerances of the pane and the opening in the vehicle body, such panes frequently leak. They are then sealed subsequently with cement in a laborious operation, but they still will not invariably provide complete and permanent sealing.

Known also are windshield panes where the sealing frame is omitted altogether. In the event of repair, however, this design causes considerable added cost of replacement.

It is a broad object of the present invention to improve the known sealing frame to achieve permanent and safe sealing in a simple fashion.

This objective is achieved by providing a resilient frame having two slots, one for accommodating the window periphery and one for accommodating a web projecting from the vehicle body. A groove in the side wall of each slot has two closely adjacent holes extending from the groove to the exterior surface of the frame. The two rims of the circumferentially extending grooves, taking as they do the shape of prominent sealing lips, fit snugly against the pane or the web as a result of their internal stresses. Fluid cement injected through one of the holes by means of a gun serves to assist the sealing action. Insertion of a resilient cord or plug in each groove, between the closely adjacent holes, insures that the grooves are completely filled with cement. This effect is promoted, where the sealing frame is rectangular, by placing the holes on a long side of the frame.

An embodiment of the invention is more fully described below with reference to the accompanying drawings, in which.

Figure 1:
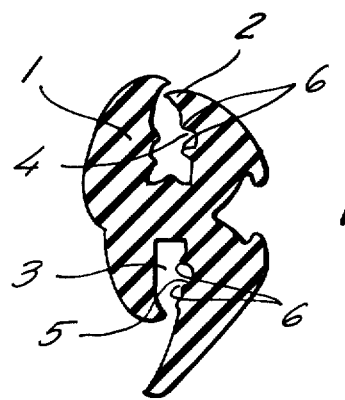
FIG. 1 is a cross-sectional view illustrating the special-section frame of the present invention.
Figure 2:
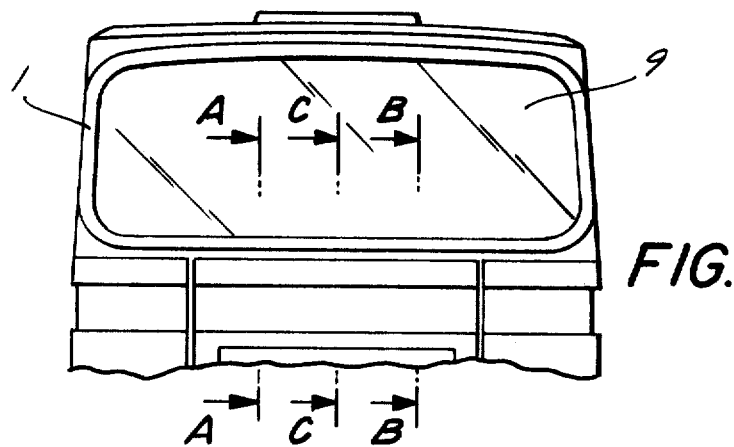
FIG. 2 illustrates the special-section frame arranged on a motor vehicle.
Figures 3A, 3B, 3C:
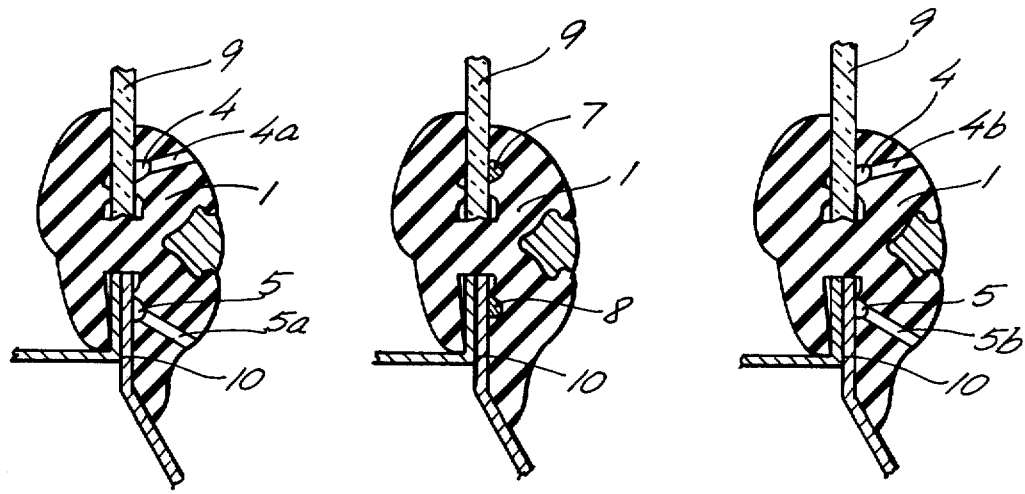

FIGS. 3A, 3B, and 3C are cross-sectional views taken along lines A—A, B—B, and C—C of FIG. 2, the special-section frame in its installed condition.

A sealing frame, or gasket, 1 of resilient material, e.g. rubber, is formed with a continuous slot 2 for accommodating the peripheral margin of a front windshield or rear window pane 9 of a vehicle. The sealing frame also has a continuous slot 3 for accommodating a web 10 of the vehicle body which surrounds the opening into which the windshield or window is placed.

Formed along an interior surface of slot 2, which faces the exterior side of the windshield or window, is a groove 4. A similar groove 5 is formed in an interior surface of slot 3 which faces the exterior side of web 10. It is the interface between the sealing frame 1 and the exterior faces of the windshield or rear window and the web which requires special sealing against the elements. The opposite edges of each of the grooves 4 and 5 have the form of sealing lips 6 which fit tightly against the window and web surfaces.

Two holes $4a$ and $4b$ (FIGS. 3A and 3B) extend from groove 4 to the exterior surface of the gasket 1, and two holes $5a$ and $5b$ extend from groove 5 to the exterior surface of the gasket. Through these holes, a highly flowable, fast curing and permanently elastic cement is introduced into grooves 4 and 5. Holes $4a$ and $4b$, and holes $5a$ and $5b$, are located very close together on one of the long sides of gasket 1 (the spacing between section lines A—A and B—B has been exaggerated in FIG. 2 for the sake of clarity).

Sealing frame 1 is assembled with a web 10 within continuous slot 3 and the margin of a windshield or window 9 within continuous slot 2. A cord or plug 7 (FIG. 3c) of resilient material is inserted in groove 4, between holes $4a$ and $4b$, and another cord or plug 8 of resilient material is inserted in groove 5, between holes $5a$ and $5b$. The plugs 7 and 8 fit very tightly within their respective grooves.

The cement is injected under pressure into one of the holes $4a$ or $4b$. Plug 7 causes the cement to travel through groove 4 around substantially the entire length of sealing frame 1. When the cement begins to issue from the other of the holes $4a$ or $4b$, groove 4 is completely filled with cement, except for the short length of groove in which plug 7 is located. Groove 5 is filled with cement in the same way, i.e., cement is introduced into hole $5a$, and when it issues from hole $5b$ there is an indication that the groove has been filled.

This invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A resilient sealing frame adapted to extend continuously around the periphery of a vehicle window for location between the window and the vehicle body, the sealing frame including:

A continuous slot for snugly accommodating the peripheral margin of a window, a continuous groove in one wall of the slot facing a surface of the window, the groove being flanked by prominent lips adapted to seal against the surface of the window, the open side of the groove being closed by the surface of the window which it faces, a pair of holes extending from the groove to the exterior surface of the sealing frame, and a resilient cement filling the length of the groove between the holes.

2. A resilient sealing frame as defined in claim 1 including a second continuous slot for snugly accommodating a web projecting from the vehicle body and surrounding an opening in the body into which the window fits, a second continuous groove in one wall of the second slot facing a surface of the web, the open side of the second groove being closed by the surface of the web which it faces, a pair of holes extending from the groove to the exterior surface of the sealing frame, and a resilient cement filling the length of the groove between the holes.

3. A resilient sealing frame as defined in claim 1 or 2 wherein the two holes of each pair are closely spaced apart, to define a short length of groove and a long length of groove between the two holes, means tightly plugging the short length of groove between the two holes, and the resilient cement filling the long length of groove between the two holes.

4. A resilient sealing frame as defined in claim 3, wherein the sealing frame is generally rectangular, and each pair of holes is located on a long side of the frame.

5. A method of sealing a vehicle window within an opening in a vehicle body, the body being formed with a web surrounding the opening, comprising the steps of:
providing a resilient sealing frame having two oppositely facing continuous slots, a continuous groove in one wall of each slot, and a pair of closely spaced-apart holes extending from each groove to the exterior surface of the frame,
inserting the peripheral margin of a window into one of the slots and inserting the web into the other slot,
plugging the short length of groove between the two holes and
introducing a fluid cement, under pressure, into one of each pair of holes and continuing to introduce the cement until it appears at the other of the pair of holes.

* * * * *